C. L. THOMPSON.
PHOTOGRAPHIC CAMERA.
APPLICATION FILED MAR. 31, 1917.
1,326,379.
Patented Dec. 30, 1919.
2 SHEETS—SHEET 2.
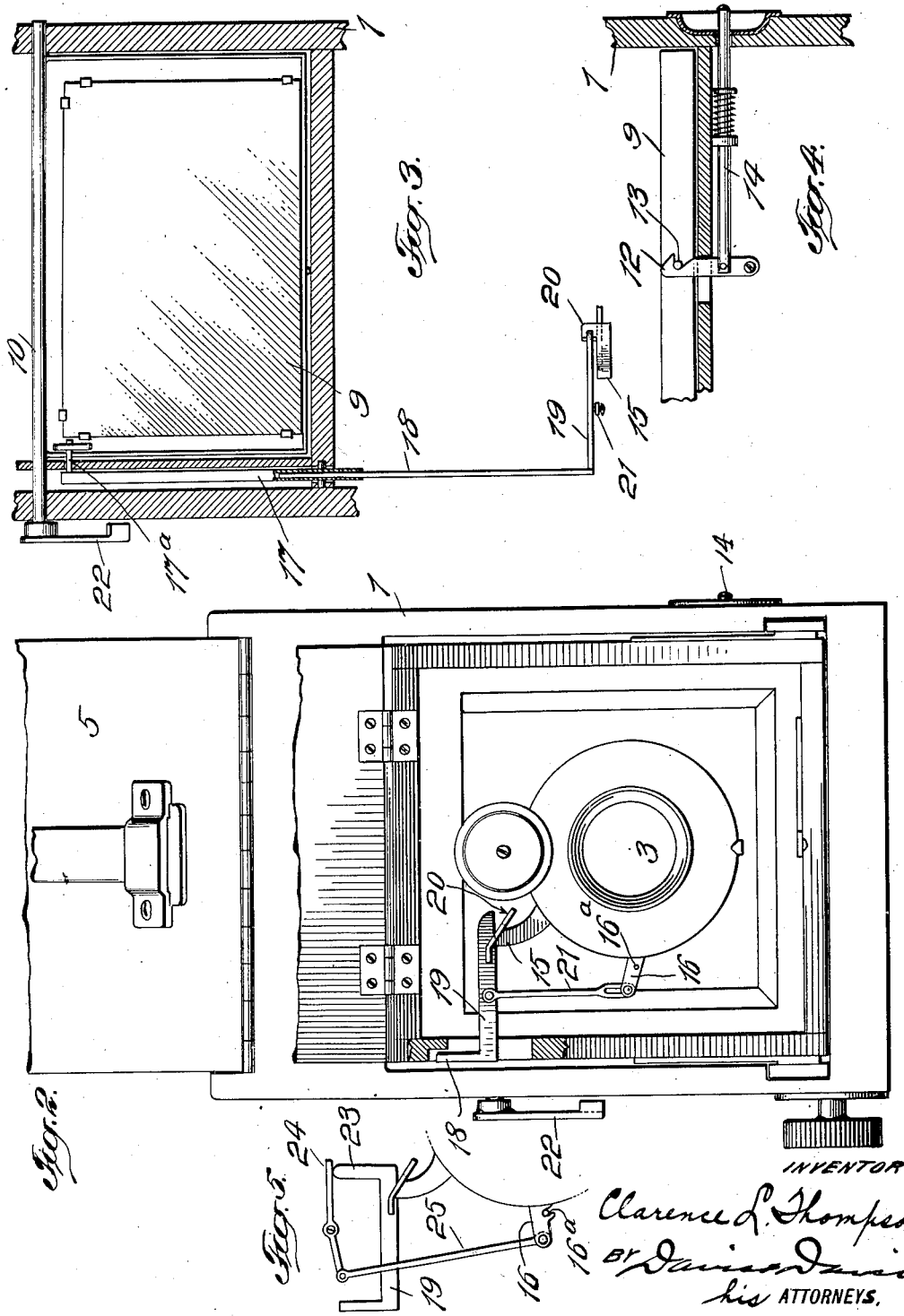

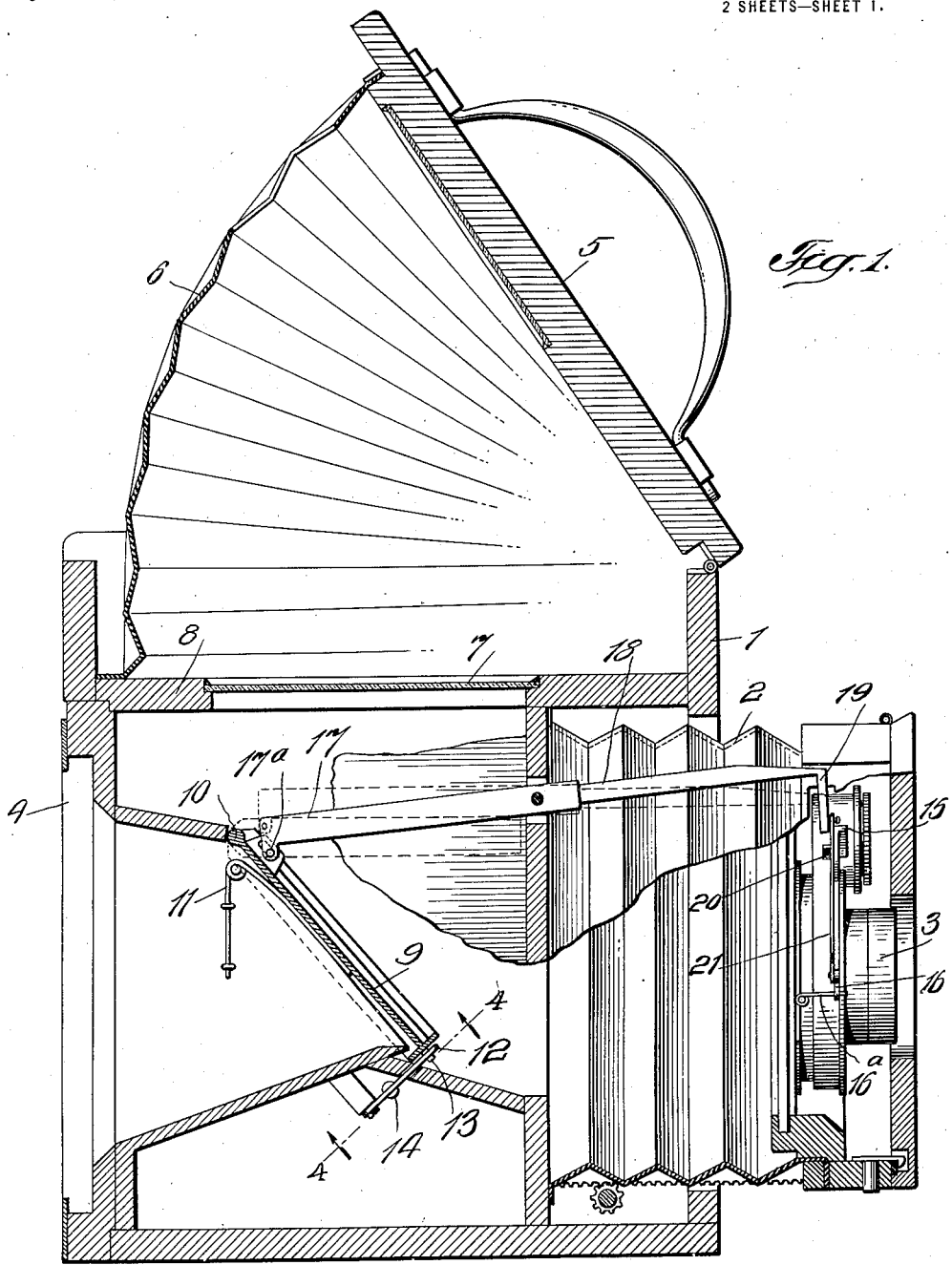

UNITED STATES PATENT OFFICE.

CLARENCE L. THOMPSON, OF PORT WASHINGTON, NEW YORK.

PHOTOGRAPHIC CAMERA.

1,326,379.   Specification of Letters Patent.   Patented Dec. 30, 1919.

Application filed March 31, 1917. Serial No. 158,776.

*To all whom it may concern:*

Be it known that I, CLARENCE L. THOMPSON, a citizen of the United States, and resident of Port Washington, county of Queens, and State of New York, have invented certain new and useful Improvements in Photographic Cameras, of which the following is a specification.

This invention relates to certain improvements in photographic cameras of that type known as the "Reflex," and wherein the object to be photographed is focused on a mirror and the image reflected from the mirror to a ground glass plate located in the top of the camera box, the image being of the same size as the picture to be taken on the sensitized plate or film. Cameras of this type have heretofore been provided with a focal plane or curtain shutter located back of the camera and just in front of the sensitized plate, said curtain being provided with transverse slots of various widths in order to give variable time exposures.

Cameras of this type have heretofore been adapted more particularly for very rapid exposure work, and have been successful only in the hands of experienced operators. The cost of these cameras has been very great, and for that reason, as well as because of their difficulty of operation, they have not been used by the ordinary amateur or inexperienced photographer.

One of the main objects of this invention is to provide a camera of this type, of simple, cheap but efficient construction, which will be adapted especially for the use of the amateur or the inexperienced photographer.

Another object of the invention is to provide a camera of the reflex type, wherein the ordinary lens tube shutter may be employed, means being provided to operate the shutter through the mirror setting and releasing means.

Another important object of the invention is to provide a camera of the type mentioned herein, wherein the placing of the mirror in focusing position will open the leaves of the shutter and hold them in their open position until the mirror is released for the exposure.

Another object of the invention is to provide means whereby upon the release of the mirror the shutter will first be closed and held closed during the movement of the mirror, and will then be operated for the exposure.

The invention as described herein, is adapted for use with a well-known type of lens tube shutter, and it is thought unnecessary to completely illustrate or describe the said shutter, except the connections thereof with the operating means which constitute the essential feature of this invention.

In the drawings, Figure 1 is a longitudinal vertical sectional view of a reflex type of camera, provided with the invention;

Fig. 2 a front elevation thereof;

Fig. 3 a detail horizontal sectional view, showing the shutter operating means;

Fig. 4 a detail horizontal sectional view on the line 4—4 of Fig. 1, showing the mirror releasing means; and Fig. 5 a detail front elevation of a slightly modified form of the means for operating the shutter.

Referring to the various parts by numerals, 1 designates the body of the camera; 2 the usual bellows, and 3 the lens tube which is carried by the usual lens board secured to the front end of the bellows. These parts of the camera may be of any suitable construction, and it is thought unnecessary to describe the details thereof.

At the rear end of the camera box is mounted the usual plate holder 4. It will, of course, be understood that the ordinary roll film holder may be used, if desired. Pivoted to the top of the camera box is the cover 5, which is connected at its rear end by the bellows 6 to the top of the camera box at the rear end thereof. This bellows is provided with the usual sight opening through which the ground glass 7 may be viewed, the said ground glass being secured in the upper wall 8 of the camera box. Within the exposure chamber of the camera is mounted the usual mirror 9, said mirror being hinged at its upper end, as shown at 10, and provided with the spring 11 for moving said mirror into its upper horizontal position, as shown in dotted lines in Fig. 1. The mirror is adapted to be swung down into focusing position and to be secured in said position by a latch 12. The mirror frame is provided with a pin 13 which is adapted to be engaged by the spring latch 12 to lock the mirror in its focusing position, as shown in Fig. 1. Connected to the latch 12 is a release bar 14, the end of which projects through the side of the camera box, as clearly shown in Fig. 4 of the drawings. It is obvious that by forcing inwardly the latch bar, the latch 12 will be released from the pin 13 and the mirror frame will be swung upwardly to permit of the exposure of the sensitized plate. This is common in cameras of this type.

The lens tube is fitted with a well-known type of diaphragm shutter adapted to be operated by the depression of the release lever 15. This shutter is also provided with an opening lever 16, by means of which the leaves of the diaphragm shutter may be swung into open position for the purpose of focusing. In the ordinary construction this shutter is manually operated through the lever 16 for its opening and closing movement. To automatically close it a spring 16$^a$ is connected to the lever 16, said spring moving said lever to close the shutter upon the release of the lever, as hereinafter described, the subsequent opening and closing of the shutter for the purpose of making an exposure being accomplished through the depression of the operating lever 15. As this is a well-known type of shutter, with the exception of the closing spring 16$^a$, it is thought unnecessary to further illustrate or describe its construction.

Within the camera box and above the camera is mounted a horizontal lever 17, the rear end of said lever being connected to the mirror frame near its pivotal point, by means of a pin-and-slot connection 17$^a$, whereby there will be the desired lost motion between these two parts. The lever 17 is tubular, and adjustable therein and projecting from its forward end, is an arm 18 whose forward end extends along the side of the bellows to the lens board. The arm 18 may be adjusted longitudinally in the tubular lever 17 in order to follow the forward and backward adjustment of the lens board in the focusing operations. The forward end of the adjustable arm 18 is bent downwardly to form the finger piece 19, which is adapted to engage the finger piece 20 on the operating lever 15, so that upon the depression of the arm 18 the operating lever 15 will be moved downwardly to operate the shutter. The adjustable arm 18 may be connected to the lens board or to the operating lever 15 in any suitable manner, so that as the lens board is adjusted for focusing, the finger 19 will maintain its operative relation with the operating lever 15 and always be in a position to actuate said lever.

Connected to the forward end of the arm 18 is a depending link 21, the lower end of which is connected by means of a pin-and-slot arrangement to the end of the shutter opening lever 16, so that upon the upward movement of the arm 18 the lever 16 will be lifted and the shutter held in its open position.

Connected to the pivot rod 10 of the mirror is a setting lever 22, by means of which the mirror may be swung downwardly to its latched position.

The operation of the device may be briefly described as follows:

When the mirror is swung down to its focusing position, the rear end of the lever 17 is swung downwardly, thereby moving to its upper or set position the finger piece 19. The upward movement of the forward end of the extension bar 18 lifts the link 21, thereby opening the shutter through the operation of the opening lever 16. After the focusing operation is complete, and it is desired to make the exposure, the rod 14 is pressed inwardly, thereby operating latch 12 to release the mirror frame. The upward movement of the mirror frame throws downwardly the forward end of the arm 18, causing the finger piece 19 to actuate the shutter operating lever 15. It is to be observed that the shutter opening lever 16 is released during the first part of the downward movement of the finger piece 19, thereby permitting the shutter to close immediately. This operation is timed so that the shutter will be closed before the mirror has moved sufficiently to permit light to pass to the sensitized plate. The shutter operating lever 15 is so arranged that it will release the shutter for the exposure upon the completion of its downward movement, so that the shutter will not be opened for the exposure until the finger piece 19 has nearly completed its downward movement. This allows ample time for the mirror frame to be swung to its uppermost position out of the way of the light rays passing to the sensitized plate through the lens opening in the shutter. It is manifest, therefore, that the single operation of releasing the mirror from its focusing position first closes the shutter; permits the mirror to be moved upwardly out of the path of the light rays admitted through the lens, and then operates the shutter for the exposure. It is also manifest that the single operation of swinging the mirror down into focusing position opens the shutter temporarily for the focusing operation.

In Fig. 5 the operating finger 19 is formed with an upwardly extending lug 23, which is adapted to engage one end of a horizontally arranged lever 24, the other end of said lever being connected by link 25 with the shutter opening arm 16. In this arrangement of the parts the shutter opening lever is operated by moving it downwardly. In the construction shown in Fig. 2 the said lever is operated by an upward movement. It is manifest that either of these arrangements of parts may be used.

It is manifest from the foregoing that I provide a very simple shutter operating means for cameras of the reflex type, whereby the ordinary and well-known diaphragm form of shutters used in lens tubes may be employed. This adaptation of the reflex type of camera for use with the ordinary lens shutter brings this type of camera within the use of the amateur or unprofessional photographer.

What I claim is:

1. A camera comprising a casing, a lens tube shiftable relatively to the casing for focusing, a shutter carried by said lens tube, a trip for actuating the shutter to make an exposure, a focusing mirror pivoted within the casing, a ground glass to receive the reflection of the image from the mirror, a latch for holding the mirror in focusing position, a spring tending to normally swing the mirror out of the path of the light rays passing through the lens tube, a lever for opening the shutter for focusing, an extensible lever pivotally held intermediate its ends to the casing and pivotally held at its rear end to the mirror, and constantly maintained connections between the forward end of said extensible lever and said exposure trip and shutter-opening lever adapted when the mirror is moved to focusing position to hold the shutter open and when the mirror is released to permit the shutter to close prior to the movement of the mirror out of the path of the light rays and to automatically trip the shutter to make an exposure when the mirror has moved out of the path of the light rays.

2. A camera comprising a casing, a lens tube adjustable forwardly and rearwardly of the casing for focusing, a shutter carried by the lens tube, a holder for a sensitized surface, a focusing mirror pivoted in the casing, a spring for normally moving the mirror out of focusing position, a handle for swinging the mirror to focusing position, a spring-pressed latch for locking the mirror in focusing position, an extensible lever pivoted in the casing and operatively connected to be vibrated by the mirror, and connections between said lever and the shutter for opening and closing the shutter during movement of the mirror respectively toward and from focusing position and for actuating the shutter to make an exposure at the completion of the movement of the mirror away from focusing position.

In testimony whereof I hereunto affix my signature.

CLARENCE L. THOMPSON.